US009500562B2

(12) United States Patent
Baker et al.

(10) Patent No.: US 9,500,562 B2
(45) Date of Patent: Nov. 22, 2016

(54) KERR PHASE-INTERROGATOR FOR SENSING AND SIGNAL PROCESSING APPLICATIONS

(71) Applicant: UNIVERSITY OF OTTAWA, Ottawa (CA)

(72) Inventors: Chams Baker, Ottawa (CA); Xiaoyi Bao, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 177 days.

(21) Appl. No.: 14/614,510

(22) Filed: Feb. 5, 2015

(65) Prior Publication Data

US 2016/0231197 A1    Aug. 11, 2016

(51) Int. Cl.
*G01M 11/00* (2006.01)

(52) U.S. Cl.
CPC ..... *G01M 11/3172* (2013.01); *G01M 11/3181* (2013.01)

(58) Field of Classification Search
CPC ............... G01M 11/3172; G01M 11/3181; G01M 11/00
USPC .......................................................... 356/73
See application file for complete search history.

(56) References Cited

U.S. PATENT DOCUMENTS 4,826,314 A * 5/1989 Comte .................... G01S 17/88
                                                        356/73.1

OTHER PUBLICATIONS

W. Eickhoff and R. Ulrich, "Optical frequency domain reflectometry in single-mode fiber," Appl. Phys. Lett. 39, 693-695 (1981).
U. Glombitza and E. Brinkmeyer, "Coherent frequency-domain reflectometry for characterization of single-mode integrated-optical waveguides," J. Lightwave Technol. 11, 1377-1384 (1993).
J. P. Von derWeid, R. Passy, G. Mussi, and N. Gisin, "On the characterization of optical fiber network components with optical frequency domain reflectometry," J. Lightwave Technol. 15, 1131-1141 (1997).
M. Froggatt and J. Moore, "High-spatial-resolution distributed strain measurement in optical fiber with Rayleigh scatter," Appl. Opt. 37, 1735-1740 (1998).
G. Mussi, N. Gisin, R. Passy, and J. P. vonderWeid, "-152.5 dB sensitivity high dynamic-range optical frequencydomain reflectometry," Electron. Lett. 32, 926-927 (1996).
J. Geng, C. Spiegelberg, and S. Jiang, "Narrow linewidth fiber laser for 100-km optical frequency domain reflectometry," Photonics Tech. Lett. 17, 1827-1829 (2005).
X. Fan, Y. Koshikiya, N. Araki, and F. Ito, "Field trials of PNC-OFDR in different environments for detecting short beat lengths," IEEE Photon. Technol. Lett. 24, 1288-1291 (2012).
X. Fan, Y. Koshikiya, and F. Ito, "Centimeter-level spatial resolution over 40 km realized by bandwidth-division phasenoise-compensated ofdr," Opt. Express 19, 19122-19128 (2011).

(Continued)

*Primary Examiner* — Roy M Punnoose
(74) *Attorney, Agent, or Firm* — Miles & Stockbridge P.C.; Ajay A. Jagtiani (57) ABSTRACT

A Kerr medium is introduced into OFDR configuration to enable phase to power variation conversion thereby enabling an all-optical beat signal acquisition, thus eliminating performance limits associated with bandwidth capabilities of electronic and optoelectronic components.

30 Claims, 4 Drawing Sheets (56) References Cited

OTHER PUBLICATIONS

Z. Ding, X. S. Yao, T. Liu, Y. Du, K. Liu, Q. Han, Z. Meng, J. Jiang, and H. Chen, "Long measurement range ofdr beyond laser coherence length," IEEE Photon. Technol. Lett. 25, 202-205 (2013).
R. I. MacDonald, "Frequency domain optical reflectometer," Appl. Opt. 20, 1840-1844 (1981).
S. Venkatesh and D. W. Dolfi, "Incoherent frequency modulated cw optical reflectometry with centimeter resolution," Appl. Opt. 29, 1323-1326 (1990).
B. Schlemmer, "A simple and very effective method with improved sensitivity for fault location in optical fibers," IEEE Photon. Technol. Lett. 3, 1037-1039 (1991).
C. Baker and X. Bao, "Displacement sensor based on kerr induced phase-modulation of orthogonally polarized sinusoidal optical signals," Opt. Express 22, 9095-9100 (2014).
A. Boskovic, S. V. Chernikov, J. R. Taylor, L. Gruner-Nielsen, and O. A. Levring, "Direct continuous-wave measurement of n2 in various types of telecommunication fiber at 1.55 µm," Opt. Lett. 21, 1966-1968 (1996).
M. Rochette, C. Baker, and R. Ahmad, "All-optical polarization-mode dispersion monitor for return-to-zero optical signals at 40 gbits/s and beyond," Opt. Lett. 35, 3703-3705 (2010).
X. Bao and L. Chen, "Recent progress in distributed fiber optic sensors," Sensors 12, 8601-8639 (2012).

* cited by examiner

KERR PHASE-INTERROGATOR FOR SENSING AND SIGNAL PROCESSING APPLICATIONS

BACKGROUND

Field of the Invention

The present invention relates to optical frequency-domain reflectometry and more specifically to incoherent optical frequency domain reflectometry.

Related Art

Optical frequency-domain reflectometry (OFDR) is a popular technique for high-resolution fault allocation,[1] optical fiber component characterization,[1,2,3,4] and distributed temperature and strain sensing.[5] In coherent optical frequency domain reflectometry (C-OFDR) a tunable laser and an interferometer are utilized for superposing a swept-laser signal with a time-delayed version of the same signal in order to generate a beat signal[1]. Spectral analysis of the beat signal allows for the determination of the locations of reflection points along a laser path at high spatial-resolution and high dynamic-range.[1,2,6] The utilization of an interferometer makes C-OFDR highly dependent on the laser coherence properties, thus limiting the reflection detection range.[1]

Several approaches have been used for range extension in C-OFDR. Utilization of a highly coherent swept-laser implemented using a narrow linewidth fiber laser and a piezoelectric tuner has, for example, allowed for the reflection point locations as far as 95 km up along a length of fiber to be detected at an unspecified spatial-resolution.[7] Phase-noise-compensation has allowed for the location of reflection points as far as 80 km to be determined at a spatial-resolution of 20 cm.[8] Band-width division has been combined with phase-noise-compensation to locate reflections as far as 40 km at an improved spatial-resolution of 5 cm.[9] Most recently, phase-noise measurements for a swept-laser reflected from points beyond the laser coherence length has allowed for the location of Fresnel reflections, as far as 170 km, to be detected at a spatial resolution of 200 m.[10]

Incoherent optical frequency domain reflectometry (I-OFDR) has been investigated as an alternative for C-OFDR as it does not depend on the coherence length of the laser signal and therefore it intrinsically allows for long-range reflection measurements.[11,12,13] In I-OFDR, the acquisition and spectral analysis of a beat signal between a frequency-swept sinusoidal optical signal and a time-delayed version of the same signal determines the location of reflection points along the signal path. Existing implementations of I-OFDR utilize optoelectronic components and electronic signal processors for beat acquisition. The band-width cap of electronic and optoelectronic devices limit the maximum sweep frequency-span and therefore the minimum spatial-resolution achievable with conventional I-OFDR.

SUMMARY

In accordance to one broad aspect of the present invention a method comprising launching an input frequency-swept sinusoidal optical signal into a Kerr phase interrogator, wherein the input frequency-swept sinusoidal optical signal comprises a first signal portion and a second signal portion. The first signal portion comprises one or more back reflected signals resulting from propagation of a first frequency-swept sinusoidal optical signal through an optical medium, wherein the second signal portion comprises a second frequency-swept sinusoidal optical signal. The first frequency-swept sinusoidal optical signal and the second frequency-swept sinusoidal optical signal are orthogonally polarized. The method may also comprise extracting information about one or more reflection characteristics of the optical medium from one or more power variations in a frequency-swept sinusoidal optical signal at an output of the Kerr phase interrogator, thereby performing an all-optical Incoherent Optical Frequency Domain Reflectometry.

In accordance to another broad aspect of the present invention an apparatus is disclosed comprising a Kerr phase interrogator configured to receive an input frequency-swept sinusoidal optical signal, wherein the input frequency-swept sinusoidal optical signal comprises two orthogonally polarized frequency-swept sinusoidal optical signal portions with one or more relative phase variations. The apparatus may also comprise a loss device for isolating one or more power variations in a frequency-swept sinusoidal optical signal at an output of the Kerr phase interrogator, wherein, the one or more power variations in the frequency-swept sinusoidal optical signal at the output of the Kerr phase interrogator correspond to the one or more phase variations in the input frequency-swept sinusoidal optical signal.

In accordance to yet another aspect of the present invention a method is disclosed comprising inducing one or more phase variations between orthogonally polarized signal portions in an input frequency-swept sinusoidal optical signal, wherein one or more phase variations result from propagation through one or more internal or external optical mediums. The method may also comprise transmitting the input frequency-swept sinusoidal optical signal through a Kerr phase interrogator, wherein the Kerr phase interrogator converts the input frequency-swept sinusoidal optical signal with one or more phase variations into an output frequency-swept sinusoidal optical signal with one or more corresponding power variations, thereby performing an all optical beat acquisition.

In accordance to still another aspect of the present invention a method is disclosed comprising inducing one or more phase variations between orthogonally polarized signal portions of an input frequency-swept sinusoidal optical signal, to thereby produce an input frequency-swept sinusoidal optical signal having one or more phase variations, wherein the one or more phase variations result from propagation of the orthogonally polarized signal portions across separate signal paths. The method may also comprise launching the input frequency-swept sinusoidal optical signal having the one or more phase variations into an input of a Kerr phase-interrogator, to thereby produce an output frequency-swept sinusoidal optical signal having one or more power variations at an output of the Kerr phase interrogator, wherein the one or more power variations at the output of the Kerr phase-interrogator correspond to the one or more phase variations at the input of the Kerr phase-interrogator.

In accordance to yet another aspect of the present invention a method is disclosed comprising inducing one or more phase variations in an input frequency-swept optical signal, wherein the one or more phase variations are induced between orthogonally polarized signal portions of the input frequency-swept sinusoidal optical signal. The one or more phase variations result from propagation of the orthogonally polarized signal portions across separate signal paths. The method may also comprise transmitting the input frequency-swept sinusoidal optical signal through a Kerr phase interrogator, wherein the Kerr phase interrogator converts the input frequency-swept sinusoidal optical signal with one or more phase variations into an output frequency-swept sinusoidal optical signal with one or more corresponding power variations, thereby performing an all optical beat acquisition.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Definitions

Where the definition of terms departs from the commonly used meaning of the term, applicant intends to utilize the definitions provided below, unless specifically indicated.

For purposes of the present invention, it should be noted that the singular forms, "a," "an" and "the," include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing figures may be flipped over, rotated by 90° in any direction, reversed, etc.

For purposes of the present invention, the term "all optical beat acquisition" refers to a method or a process of generating and detecting a beat signal between two sinusoidal optical signals with different frequencies using an all optical configuration.

For purposes of the present invention, a value or property is "based" on a particular value, property, the satisfaction of a condition or other factor if that value is derived by performing a mathematical calculation or logical operation using that value, property or other factor.

For purposes of the present invention, the term "backscattering" refers to the reflection of waves, particles, or signals back to the direction from which they came. It is a diffuse reflection due to scattering, as opposed to specular reflection like a mirror.

For purposes of the present invention, the term "beat signal" refers to an interference optical signal resulting from combining or mixing of two light signals with different one or more optical characteristics such as linewidth, fundamental frequency, phase, intensity, polarization, etc.

For purposes of the present invention, the term "coherence" refers to an ideal property of waves that enables stationary (i.e., temporally and spatially uniform) interference.

For purposes of the present invention, the term "heterodyne" refers to a radio signal processing technique invented in which new frequencies are created by combining or mixing two frequencies. Heterodyning is useful for frequency shifting signals into a new frequency range, and is also involved in the processes of modulation and demodulation. The two frequencies are combined in a nonlinear signal-processing device such as a vacuum tube, transistor, or diode, usually called a mixer. In the most common application, two signals at frequencies $f_1$ and $f_2$ are mixed, creating two new signals, one at the sum $f_1+f_2$ of the two frequencies, and the other at the difference $f_1-f_2$. These new frequencies are called heterodynes. Typically only one of the new frequencies is desired, and the other signal is filtered out of the output of the mixer. Heterodynes are related to the phenomenon of "beats" in acoustics.

For purposes of the present invention, the term "linewidth" refers to the width of a spectral line, such as in the electromagnetic emission spectrum of an atom, or the frequency spectrum of an acoustic or electronic system. For example, the emission of an atom usually has a very thin spectral linewidth, as only transitions between discrete energy levels are allowed, leading to emission of photons with a certain energy.

For purposes of the present invention, the term "phase noise" refers to variations in phase of a signal determined by comparing the signal to the phase of another signal.

For the purposes of the current invention, the term "Kerr phase-interrogator" refers to a dielectric medium, an optical structure or combination of optical structures that near-instantaneously converts the phase variations of a sinusoidal optical signal propagating through it into power variation through Kerr induced phase-modulation.

For the purposes of the present invention, the term "back reflected" refers to a portion of the incident light that is reflected back at locations where there is a change in the refractive index of the propagation medium due to intrinsic or extrinsic features.

For purposes of the present invention, the terms "random fiber laser (RFL) refers to a random laser in which the active gain medium is an optical fiber doped with rare-earth elements such as erbium, ytterbium, neodymium, dysprosium, praseodymium, and thulium. They are related to doped fiber amplifiers, which provide light amplification without lasing.

For purposes of the present invention, the term "scattering" refers to a physical process involving the interaction of light and atoms of a gain medium resulting in emission of new photons in a wide range of directions.

For the purposes of the present invention, the term "Fresnel back reflections" refers to a portion of the incident light that is reflected back into the source fiber at locations where there is a step change in the refractive index such as fiber interface or fiber joint.

For the purposes of the present invention, the term "Kerr effect" refers to fundamental non-linear phenomena exhibited by the transmission of light through dielectric media, i.e., an effective correction to the local refractive index felt by the propagating intensive light beam.

For the purposes of the present invention, the term "Kerr medium" refers to an optical medium wherein Kerr effect is induced in response to propagation of intense optical signal.

For the purposes of the present invention, the term "frequency-swept" refers to a frequency profile that varies over time.

For the purposes of the present invention, the term "orthogonally polarized" refers to two polarization states that are at a right angle relative to one another or differ by 90 degrees of rotation.

DESCRIPTION

In accordance to one aspect of the present invention, the bandwidth cap associated with the operation of optoelectronic and electronic devices that limit the minimum achievable spatial-resolution in the conventional I-OFDR may be eliminated with development of an all-optical I-ODFR based on utilizing a Kerr phase-interrogator presented in[14] to perform an all-optical beat acquisition which may potentially allow for long-range all-optical Incoherent Optical Frequency Domain Reflectometry (I-OFDR) at micron-level spatial-resolution. In accordance to one aspect of the present invention, a novel I-OFDR setup based on a Kerr phase-interrogator and frequency-swept sinusoidal optical signal is disclosed. Theoretical analysis shows that the output of a Kerr phase-interrogator corresponds to the beat of the powers of orthogonally-polarized frequency-swept sinusoidal optical signals. Additionally, in exemplary embodiments of the present invention the performance of an all-optical I-OFDR configuration in determining the location and the reflectivity of reflection points on different length of one or more test fibers is experimentally demonstrated.

Figure 1:
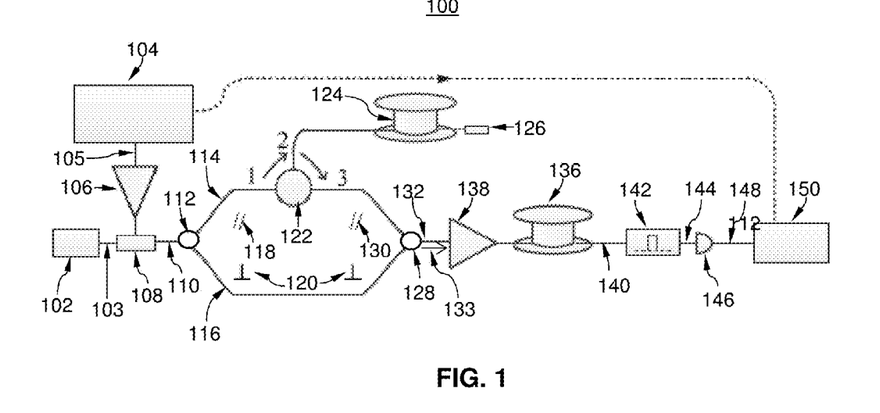
FIG. 1 is a schematic illustration of the I-ODFR experimental setup based on a Kerr phase-interrogator, according to one embodiment of the present invention.

A schematic representation of an exemplary Kerr phase-interrogator based I-OFDR system 100 is illustrated in FIG. 1. System 100 may comprise a continuous-wave (CW) laser 102 and a sinusoidal electrical signal generator 104 connected to an electro-optic modulator (EOM) 108. The output of EOM maybe split with, for example, a fiber-coupled polarization beam splitter 112 onto a sensor signal paths 114 and a reference signal path 116. The sensor signal path 114 may include a route, through an optical circulator 122, across a length of test fiber 124 that terminates into a reflector 126 and back across the length of test fiber 124 through optical circulator 126 before terminating into a fiber-coupled polarization beam combiner 128 where the reference signal path 116 also terminates. The sensor signal path and the reference signal path converge onto a common signal path 132 at the output of fiber-coupled polarization beam combiner 128. The fiber-coupled polarization beam combiner 128 may be connected to a Kerr medium 136 through, for example, an optical amplifier such as an Erbium-doped fiber amplifier 138. The Kerr-induced phase-modulated sinusoidal optical signal at the output of Kerr medium 136, also referred to as the output frequency-swept sinusoidal optical signal 140, may be filtered with a loss device, such as a band-pass filter 142 placed at the output of the Kerr medium, prior to being detected with a square law detector, such as photodetector (PD) 146, and measured with an external measurement device such as an Oscilloscope 150.

Figure 2:
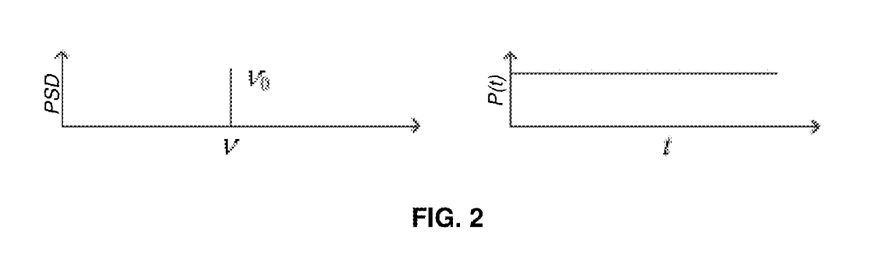
FIG. 2 is an illustration of the spectrum and the power trace of the CW carrier laser signal.
Figure 3:
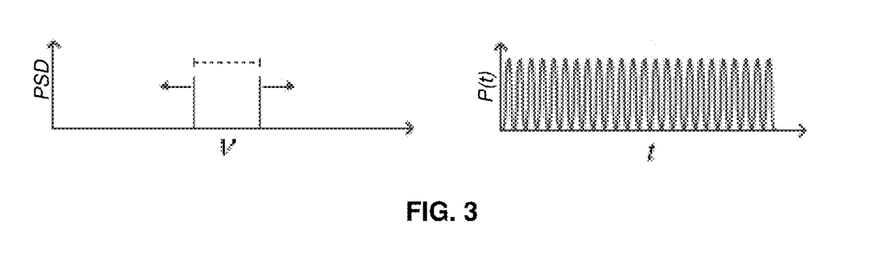
FIG. 3 is an illustration of the spectrum and the power trace of the sinusoidal laser signal for modulating the CW carrier laser signal in FIG. 2.

The power spectrum and time trace of the power signal showing constant frequency content of the CW optical signal 103 generated by CW laser 102 is illustrated in FIG. 2. CW optical signal 103 is amplitude-modulated by sinusoidal electrical signal 105 using EOM 108. The frequency-swept sinusoidal electrical signal 105 generated by sinusoidal electrical signal generator 104 maybe amplified with, for example, RF amplifier 106 prior to driving EOM 108. The time-varying frequency of the modulating electrical signal 105 is given by Equation 1. The resulting signal at the output of EOM 108 comprises a source frequency-swept sinusoidal optical signal 110 with a time-varying frequency given by Equation 2. The optical spectrum of source frequency-swept sinusoidal optical signal 110 is composed of two distinct peaks with time-varying separation ($\Delta v = f_s(t)$) where v is the optical frequency. As illustrated in FIG. 3. The source frequency-swept sinusoidal optical signal 110 at the output of the EOM 108 is split, using a fiber-coupled polarization beam splitter 112 with polarization maintaining fiber ports, into two orthogonally polarizes frequency-swept sinusoidal optical signal portions comprising a first frequency-swept sinusoidal optical signal portion 118 placed onto sensor path 114 and a second frequency-swept sinusoidal optical signal portion 120 placed onto reference path 116.

$$f_m(t) = 0.5(f_0 + \rho t) \quad (1)$$

$$f_s(t) = f_0 + \rho t \quad (2)$$

Figure 4:
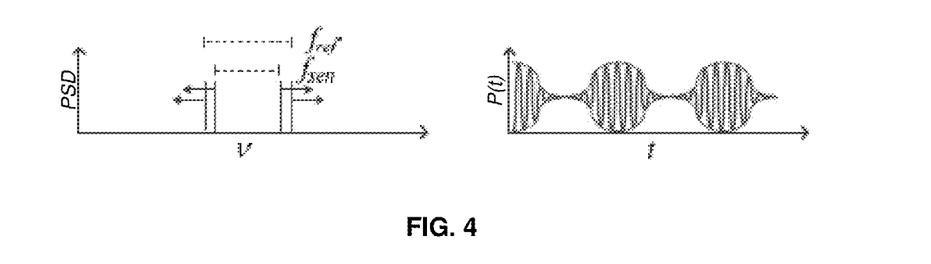
FIG. 4 is an illustration of the spectrum and the power trace of the combined reference and reflected sinusoidal signals from the reference and sensor signal paths, respectively.

First and second frequency-swept sinusoidal optical signal portions 118 and 120 correspond to parallel and perpendicular polarizations, respectively. First frequency-swept sinusoidal optical signal portion 118 entering port 1 of the optical circulator 122 is launched, through port 2 of optical circulator 122, into a fiber under test (FUT) 124 where at least a portion of it is reflected back as it propagates through FUT. Back reflected frequency-swept sinusoidal optical signal 130 resulting from propagation of first frequency-swept sinusoidal optical signal portion 118 through FUT, in addition to orthogonal polarization may also contain one or more phase variations relative to second frequency-swept sinusoidal optical signal portion 120. Back reflected frequency-swept sinusoidal optical signal 130 is injected into fiber-coupled polarization beam combiner 128 through port 3 of optical circulator 122. Fiber-coupled polarization beam combiner 128 combines the back reflected frequency-swept sinusoidal optical signal 130 coming from port 3 of the optical circulator 122, with frequency-swept sinusoidal optical signal 120 propagating across reference path 116. The input frequency-swept sinusoidal optical signal 133 at output of fiber-coupled polarization beam combiner 128 comprises orthogonally polarized frequency-swept sinusoidal optical signal portions with relative phase variation. The spectrum and the power signal time-trace of input frequency-swept sinusoidal optical signal 133 is illustrated in FIG. 4.

The amplitude of the parallel and perpendicular signal portions of the input frequency-swept sinusoidal optical signal 133 at the output of the fiber-coupled polarization beam combiner 128 are given by Equation 3 and Equation 4.

$$A_\perp = \sqrt{0.5P_P} \cos(\pi f_{ref} t + \phi_\perp) \tag{3}$$

$$A_\| = \sqrt{0.5P_P} \cos(\pi f_{sen} t + \phi_\|) \tag{4}$$

In Equations 3 and 4 parameter $\phi_\perp = \pi f_{ref} t_\perp$, $\phi_\| = \pi f_{sen} t_\|$, $f_{ref} = f_0 + \rho(t - t_\perp)$, and $f_{sen} = f_0 + \rho(t - t_\|)$ with $t_\perp$ being the delay-time required for the second frequency-swept sinusoidal optical signal portion 120 to traverse the reference path 116 to fiber-coupled polarization beam combiner 128 and $t_\|$ being the delay-time required for the back reflected frequency-swept sinusoidal optical signal 130 to travel the sensor path to fiber-coupled polarization beam combiner 128.

It should be noted that either one of the orthogonally polarized frequency-swept sinusoidal optical signal portions may be placed on the sensor path or the reference path and that it is not the intention of the forgoing description or figures to place any restriction on the assignment of a signal to path based on polarization orientation or "first" and "second" designations.

The combined signal 133 maybe launched, as an input frequency-swept sinusoidal optical signal, into a Kerr medium 136 after being amplified with, for example an Erbium-doped fiber amplifier 138 (EDFA). The input frequency-swept sinusoidal optical signal 133 is phase-modulated by the non-linear Kerr effect as it propagates through the Kerr medium 136 and as a result one or more phase variations between two orthogonally polarized sinusoidal optical signals 130 and 120, comprising the combined signal or the input frequency-swept sinusoidal optical signal 133 are converted into power variations at the output of the Kerr medium 136. The amplitudes of the perpendicular field component, $A_\perp$, and the amplitude of the parallel field components, $A_\|$, at the output of the Kerr medium 136 are given in Equation 5 and Equation 6 wherein parameters $\gamma$ and L are the waveguide non-linearity and the length of the Kerr medium 136, respectively, and $P(t) = |A_\perp|^2 + |A_\||^2$ is the combined power given by Equation 7.

In one embodiment of the present invention a length of fiber with low chromatic dispersion maybe used as a Kerr medium. Another embodiment of the present invention utilizes an approximately 4 km long fiber with a chromatic dispersion of approximately 3 ps/nm-km as Kerr medium $$A_\perp = \sqrt{0.5P_P} \cos(\pi f_{ref} t + \phi_\perp) \exp[j\gamma P(t)L] \tag{5}$$

$$A_\| = \sqrt{0.5P_P} \cos(\pi f_{sen} t + \phi_\|) \exp[j\gamma P(t)L] \tag{6}$$

$$P(t) = 0.5 \, P_P [\cos^2(\pi f_{ref} t + \phi_\perp) + \cos^2(\pi f_{sen} t + \phi_\|)] \tag{7}$$

Figure 5:
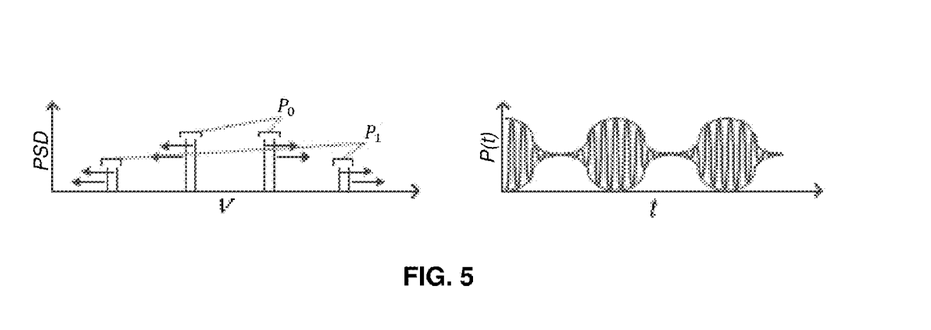
FIG. 5 is an illustration of the spectrum and the power trace of the Kerr-induced phase-modulated sinusoidal signal.
Figure 6:
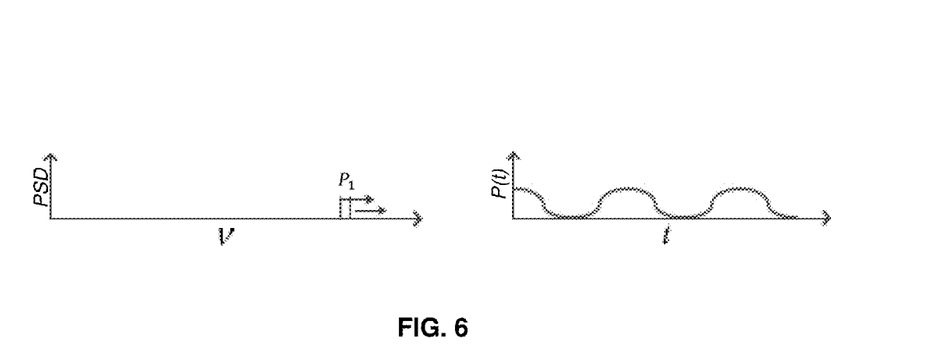
FIG. 6 is an illustration of the spectrum and the power trace of the side-band signal corresponding to the filtered Kerr-induced phase-modulated sinusoidal signal in FIG. 5.

The Kerr-induced sinusoidal phase modulation of $A_\perp$ and $A_\|$ leads to the formation of distinct sidebands $P_i$ with $i = 1, 2, 3, \ldots$, as illustrated in FIG. 5 with notation $P_0$ representing the power at the main frequency and $P_1$ representing the first side-band power signal. The ratio of $P_1(t)$ to $P_0(t)$ may be obtained analytically by applying the Jacobi-Anger expansion to Equations 1 and Equation 2 [14,15,16] as shown in Equation 8, where $\phi_{SPM} = \gamma P_P L$ is the maximum nonlinear-phase accumulated in the Kerr medium 136, $\phi_\Delta = \phi_\perp - \phi_\| = \pi f_d t_\perp - \pi (f_{ref} - f_d) t_d$, $f_d = f_{ref} - f_{sen} = \rho t_d$, and $t_d = t_\| - t_\perp$.

$$\frac{P_1(t)}{P_0(t)} = \frac{J_1^2[(\varphi_{SPM}/2)\cos(\pi f_d t + \varphi_\Delta)] + J_2^2[(\varphi_{SPM}/2)\cos(\pi f_d t + \varphi_\Delta)]}{J_0^2[(\varphi_{SPM}/2)\cos(\pi f_d t + \varphi_\Delta)] + J_1^2[(\varphi_{SPM}/2)\cos(\pi f_d t + \varphi_\Delta)]} \tag{8}$$

Utilization of the multiplication theorem for Bessel functions[14] leads to Equation 9, wherein the parameter $P_1^{max}$ represents the maximum value that the first side-band $P_1$ attains.

$$P_1(t) = P_1^{max} \cos^2(\pi f_d t + \phi_\Delta) \tag{9}$$

Equation 9 shows that the output of the Kerr phase-interrogator corresponds to the beat of the powers of two orthogonally polarized sinusoidal optical signals that oscillate at two different frequencies ($f_{ref} \neq f_{sen}$). This beat depends only on the powers of the sinusoidal optical signals allowing for I-OFDR implementation. For the special case of identical frequencies, for example, when $f_{ref} = f_{sen}$, Equation 9 reduces to $P_1 = P_1^{max} \cos^2(\phi_\Delta) = P_1^{max} \cos^2(\pi f_{ref} t_d)$ which is identical to the relation derived in C. Baker and X. Bao, "Displacement sensor based on kerr induced phase-modulation of orthogonally polarized sinusoidal optical signal," Opt. Express 22, 9095-9100 (2014), Y. Lu, C. Baker, L. Chen and X. Bao, "Group-delay based temperature sensing in linearly-chirped fiber Bragg grating using a Kerr phase-interrogator," Journal of Lightwave Technology, vol. PP, no. 99, pp. 1,1 (2014) and C. Baker, Y. Lu and X. Bao, "Chromatic-dispersion measurement by modulation phase-shift method using a Kerr phase-interrogator," Opt. Express 22, No. 19 (2014), the entire contents and disclosure of which are incorporated herein by reference.

A band-pass filter with, for example, approximately 3 GHz bandwidth and a center frequency determined by: $(v_0 + 1.5(f_s^{max} + f_2^{min})/2)$ where $v_0 = c/\lambda_0$ may be placed at the output of the Kerr medium. The Kerr-induced phase modulated output frequency-swept sinusoidal optical signal 140, at the output of Kerr medium 136 maybe filtered with band-pass filter 142 in order to isolate the first side-band power signal $P_1(t)$. It is readily appreciated that one or more side-band power signals may be isolated. The filtered Kerr-induced phase-modulated sinusoidal optical signal 144 may be detected with square law detector such as a Photodetector (PD) 146. The electrical signal 148 at the output of PD 146 may be read using, for example, an oscilloscope 150 in order to obtain a time-trace of first side-band power signal $P_1(t)$.

EXAMPLE 1

Figure 7:
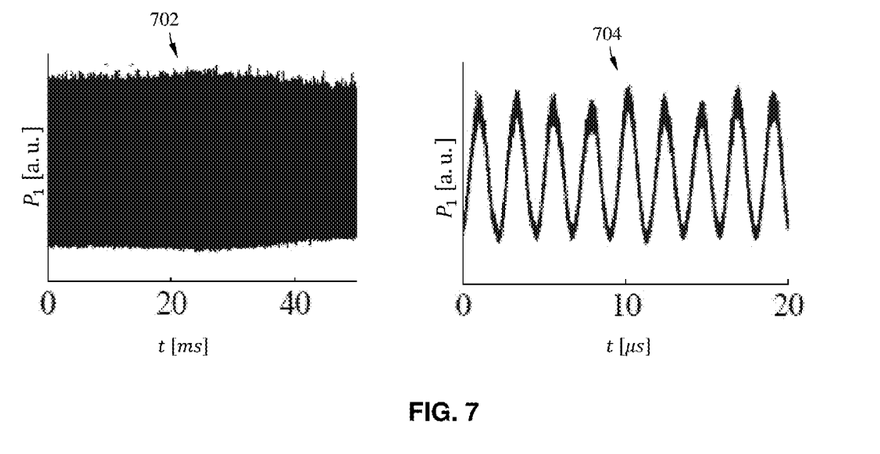
FIG. 7 is a graph showing the measured power trace signal corresponding to the first side-band component of the Kerr-induced phase-modulated sinusoidal optical signal.

A CW laser with a wavelength ($\lambda_0$) of 1550.202 nm is amplitude-modulated using a Mack-Zehnder modulator and a sinusoidal electrical signal generator to obtain a sinusoidal optical signal with a frequency varying linearly from a minimum frequency ($f_s^{min}$) of approximately 18.5 GHz to a maximum frequency ($f_s^{max}$) of approximately 19.5 GHz. The FUT has a length of approximately 2.2 km and is terminated with an ultra-polished connector (UPC) to induce Fresnel back reflections. In FIG. 7 trace plot 702 illustrate an oscilloscope display capture representing the measured value of $P_1(t)$. A section of the trace plot 702 is magnified to show the sinusoidal variation of $P_1(t)$ trace with time in accordance with Equation 9.

Figure 8:
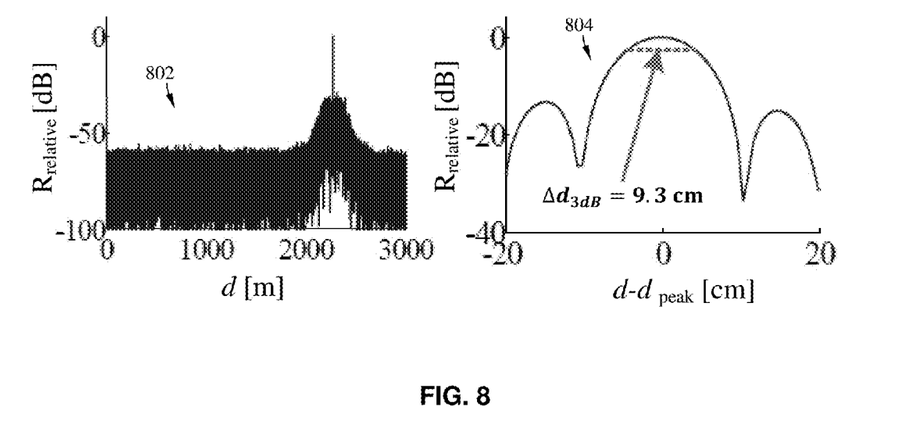
FIG. 8 is a graph illustrating the magnified section of the power trace in FIG. 7.

The spectrum of $P_1(t)$ is calculated according to the expression $|FT\{P_1(t)\}|^2$ wherein FT represents the Fourier transform operator. In order to obtain the relative reflectivity of the FUT as a function of distance, frequency parameter, f, is replaced with the distance parameter, d, expressed as $fc/2\rho n_g$, where c is the speed of light and $n_g$ is approximately equal to 1.46 and represents the group refractive index of the FUT. In FIG. 8 trace plot 802 illustrate the measured relative reflectivity as a function of distance in the FUT. The measured trace side-band power signal $P_1(t)$ is zero padded to increase the frequency resolution of the Fourier Transform so that spatial resolution ($\Delta d_{3\ dB}$) maybe determined directly from the measured data. Spatial resolution ($\Delta d_{3\ dB}$) of 9.3 cm can be directly observed from plot 804 which is a magnified section of the reflectivity trace plot 802 in FIG. 8.

Figure 9:
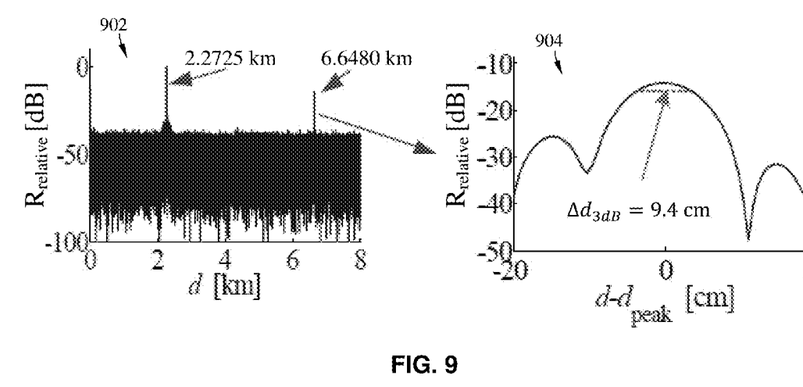
FIG. 9 is a graph illustrating the relative reflectivity as a function of distance in a test fiber (FUT).

The disclosed method for performing I-OFDR allows for the detection of multiple reflection points, in accordance to one embodiment of the present invention. FIG. 9 illustrates the measured reflectivity as a function of distance for a combination of two fibers connected using non-matching fiber connectors, such as a UPC connector and an angle-polished connector (APC), to induce strong back-reflection at the interface between the two fibers. Reflection peaks are observed at distance d of approximately 2.2725 km and distance d of approximately 6.6480 km corresponding to the locations of end-facets of the first and the second fibers.

Figure 10:
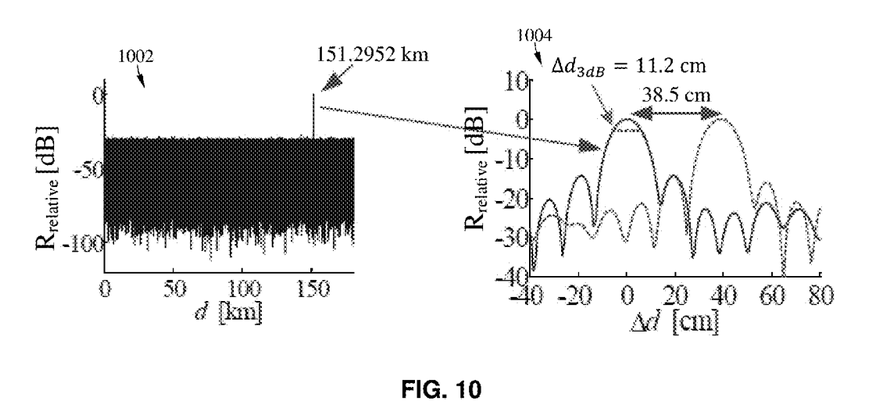
FIG. 10 is a graph illustrating the magnified image of the relative reflectivity from FIG. 9 blown-up at the peak reflection distance of 2272.49278 meters.

Furthermore, the disclosed method for performing I-OFDR may detect reflection points on hundreds of kilometers of fiber. FIG. 10 illustrates the measured reflection at the end of 151 km long fiber obtained with p of approximately 4 GHz/s, in accordance to one aspect of the present invention. An erbium doped fiber amplifier is used for amplification of the signal reflected from the end of the 151 km long fiber to compensate for the attenuation induced by traveling along the fiber.

The frequency f corresponding to a reflection point located at distance d is given by $2\rho d n_g/c$ leading to a spatial resolution ($\Delta d$) that may be expressed as $\Delta f c/2\rho n_g$. The spectrum of the measured time-trace side-band power signal $P_1(t)$ is a squared sinc function for which the 3 dB frequency resolution ($\Delta f_{3\ dB}$) may be expressed as $0.88/t_{span}$ where, $t_{span}$ represents the measured time-trace interval. Consequently 3 dB spatial resolution ($\Delta d_{3\ dB}$) may be expressed as $0.88c/2\rho n_g t_{span}$. Using $\rho$ of approximately 20 GHz/s, $n_g$ of approximately 1.46 and setting $t_{span}$ to approximately 50 ms leads to spatial resolution ($\Delta d_{3\ dB}$) of 9.04 cm. This in close agreement with the measured $\Delta d_{3\ dB}$ values of 9.04 cm at a distance d of 2.2725 km and 9.4 cm at distance d of 6.6480 km as illustrated by trace plot 804 and 904 in FIG. 8 and FIG. 9, respectively. To further investigate the spatial-resolution, relative reflectivity in a 151 km long fiber is measured before and after its length is extended by attaching a 37.4 cm fiber cord to the fiber-end. Measured reflectivity as a function of distance d are illustrate in FIG. 10. Plot 1002 in FIG. 10 illustrate the reflectivity measurements as a function of distance for the 151 km. Plot 1004 in FIG. 10 illustrates the magnified image of the reflection peak at the end of the 151 km fiber and the peak that results after connecting a 37.4 cm fiber cord at the end of the 151 km fiber. The 3 dB spatial-resolution ($\Delta d_{3\ dB}$) for the reflectivity peak at d=151.2952 km is 11.2 cm showing that the spatial-resolution is maintained over long distances. Furthermore, the reflection peaks at 151 km and 151.2952 km are clearly distinguishable in magnified reflectivity plot 1004. It is observed that the reflection peaks, in plot 1004, are separated by 38.5 cm which is in close agreement with the length of the fiber cord.

In the exemplary experimental set ups in select embodiments of the present invention described above the sweep frequency-span $f_{span}$, equivalently expressed as $\rho t_{span}$, is approximately set to 1.0 GHz. Utilization of wide-bandwidth electro-optic modulators and sinusoidal electrical signal generators may increase $f_{span}$ to approximately 100 GHz allowing for spatial resolution ($\Delta d_{3\ dB}$) as low as approximately 0.9 mm, in accordance with one embodiment of the present invention. Furthermore, the disclosed approach for performing I-OFDR utilizes all-optical processing which eliminates the electronic bandwidth limitations in existing I-OFDR implementations. In accordance to another embodiment of the present invention, a frequency-swept sinusoidal optical signal with $f_{span}$ of greater than 1.0 THz may be generated by superposition of a CW laser and a swept-laser allowing for micron-level spatial-resolution ($\Delta d_{3\ dB}$) of below 90 µm.

The measured time trace for side-band power signal denoted as $P_1^{meas}(t)$ may be expressed as Equation 10 below $$P_1^{meas}(t)=[P_1^{ideal}(t)+v(t)]\times\mathrm{rect}(t) \qquad (10)$$

where $P_1^{ideal}(t)$ is the ideal signal, v(t) is the noise and rect(t) is a square pulse with a duration $t_{span}$. According to Equation 10 lower the noise closer the measured data represents the ideal signal $P_1^{ideal}(t)$. In accordance to one embodiment of the present invention the signal-to-noise ratio (SNR) of $P_2^{meas}(t)$ maybe increased through enabling nonlinear Kerr effects to be induced at lower signal powers by, for example, using a highly-nonlinear chalcogenide fiber as Kerr medium and thus eliminating the need for optical amplifiers that generate noise through amplified spontaneous emission. In accordance to another embodiment of the present invention SNR may be increased by using low-noise photo-diodes to reduce dark-current noise and shot-noise such that $P_1^{ideal}(t)$ is significantly greater than v(t). In yet another embodiment of the present invention, SNR penalty associated with the finite measurement duration $t_{span}$, obtained from the normalized spectrum of rect(t) and expressed as $\sin^2(\pi f t_{span})/(\pi f t_{span})^2$ is reduced by a factor $N^2$ by, for example, increasing the sweep frequency-span and as a result $t_{span}$ by factor N.

The power of the reflected signal must be weak in the presence of multiple reflectors to prevent the generation of artificial peaks that arise from mixing of the frequencies corresponding to actual reflection peaks. Unfortunately, the dynamic-range is reduced when the signal from the sensor path is weaker than the signal from the reference path. Enhancement of the dynamic-range is essential for the detection of Rayleigh back-scattering in the FUT allowing for distributed sensing of strain and temperature.[5,17] One embodiment of the present invention focus on enhancement of the dynamic-range for the implementation of distributed temperature and strain sensors.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

REFERENCES

The following references are referred to above and/or describe technology that may be used with the present invention and contents and disclosures of the following references are incorporated herein by reference:

1. W. Eickhoff and R. Ulrich, "Optical frequency domain reflectometry in single-mode fiber," Appl. Phys. Lett. 39, 693-695 (1981).
2. H. Barfuss and E. Brinkmeyer, "Modified optical frequency domain reflectometry with high spatial resolution for components of integrated optic systems," J. Lightwave Technol. 7, 3-10 (1989).
3. U. Glombitza and E. Brinkmeyer, "Coherent frequency-domain reflectometry for characterization of single-mode integrated-optical waveguides," J. Lightwave Technol. 11, 1377-1384 (1993).

4. J. P. Von derWeid, R. Passy, G. Mussi, and N. Gisin, "On the characterization of optical fiber network components with optical frequency domain reflectometry," J. Lightwave Technol. 15, 1131-1141 (1997).
5. M. Froggatt and J. Moore, "High-spatial-resolution distributed strain measurement in optical fiber with Rayleigh scatter," Appl. Opt. 37, 1735-1740 (1998).
6. G. Mussi, N. Gisin, R. Passy, and J. P. vonderWeid, "−152.5 dB sensitivity high dynamic-range optical frequency domain reflectometry," Electron. Lett. 32, 926-927 (1996).
7. J. Geng, C. Spiegelberg, and S. Jiang, "Narrow linewidth fiber laser for 100-km optical frequency domain reflectometry," Photonics Tech. Lett. 17, 1827-1829 (2005).
8. X. Fan, Y. Koshikiya, N. Araki, and F. Ito, "Field trials of PNC-OFDR in different environments for detecting short beat lengths," IEEE Photon. Technol. Lett. 24, 1288-1291 (2012).
9. X. Fan, Y. Koshikiya, and F. Ito, "Centimeter-level spatial resolution over 40 km realized by bandwidth-division phase-noise-compensated ofdr," Opt. Express 19, 19122-19128 (2011).
10. Z. Ding, X. S. Yao, T. Liu, Y. Du, K. Liu, Q. Han, Z. Meng, J. Jiang, and H. Chen, "Long measurement range ofdr beyond laser coherence length," IEEE Photon. Technol. Lett. 25, 202-205 (2013).
11. R. I. MacDonald, "Frequency domain optical reflectometer," Appl. Opt. 20, 1840-1844 (1981).
12. S. Venkatesh and D. W. Dolfi, "Incoherent frequency modulated cw optical reflectometry with centimeter resolution," Appl. Opt. 29, 1323-1326 (1990).
13. B. Schlemmer, "A simple and very effective method with improved sensitivity for fault location in optical fibers," IEEE Photon. Technol. Lett. 3, 1037-1039 (1991).
14. C. Baker and X. Bao, "Displacement sensor based on ken induced phase-modulation of orthogonally polarized sinusoidal optical signals," Opt. Express 22, 9095-9100 (2014).
15. A. Boskovic, S. V. Chernikov, J. R. Taylor, L. Gruner-Nielsen, and O. A. Levring, "Direct continuous-wave measurement of n2 in various types of telecommunication fiber at 1.55 µm," Opt. Lett. 21, 1966-1968 (1996).
16. M. Rochette, C. Baker, and R. Ahmad, "All-optical polarization-mode dispersion monitor for return-to-zero optical signals at 40 gbits/s and beyond," Opt. Lett. 35, 3703-3705 (2010).
17. X. Bao and L. Chen, "Recent progress in distributed fiber optic sensors," Sensors 12, 8601-8639 (2012).

What is claimed is:

1. A method comprising:
launching an input frequency-swept sinusoidal optical signal into a Kerr phase interrogator,
wherein the input frequency-swept sinusoidal optical signal comprises a first signal portion and a second signal portion,
wherein the first signal portion comprises one or more back reflected signals resulting from propagation of a first frequency-swept sinusoidal optical signal through an optical medium,
wherein the second signal portion comprises a second frequency-swept sinusoidal optical signal,
wherein the first frequency-swept sinusoidal optical signal and the second frequency-swept sinusoidal optical signal are orthogonally polarized; and
extracting information about one or more reflection characteristics of the optical medium from one or more power variations in a frequency-swept sinusoidal optical signal at an output of the Kerr phase interrogator, thereby performing an all-optical Incoherent Optical Frequency Domain Reflectometry.

2. The method of claim 1, wherein the first signal portion and the second signal portion have identical frequencies.

3. The method of claim 1, wherein the first signal portion and the second signal portion that oscillate at two different frequencies.

4. The method of claim 1, wherein the Kerr phase interrogator comprise a Kerr medium.

5. The method of claim 4, wherein the Kerr medium comprise a length of fiber with low chromatic dispersion.

6. The method of claim 5, wherein the Kerr medium comprise an approximately 4 km long fiber with a chromatic dispersion of approximately 3 ps/nm-km.

7. The method of claim 1, wherein the one or more back reflected signals resulting from propagation of the first frequency-swept sinusoidal optical signal through the optical medium are combined with the second signal portion using a fiber-coupled polarization beam combiner.

8. The method of claim 1 wherein the optical medium comprises an optical fiber.

9. The method of claim 8 wherein the optical fiber is terminated with a reflector.

10. The method of claim 1 wherein an optical circulator is used for launching the first frequency-swept sinusoidal optical signal into the optical medium.

11. The method of claim 1 wherein the orthogonally polarized first and the second frequency-swept sinusoidal optical signals are generated using a CW laser modulated with a frequency-swept sinusoidal electrical signal and split using a fiber-coupled polarization beam splitter.

12. The method of claim 1 wherein the output of the Kerr phase interrogator is filtered with a band-pass filter to isolate one or more side-band power signals from the output of the Kerr phase interrogator.

13. The method of claim 12 wherein the band-pass filter has a bandwidth of approximately 3 GHz.

14. The method of claim 12 wherein the output of the band-pass filter is detected and measured using a photodetector and an external measurement device.

15. The method of claim 1 wherein the frequency-swept sinusoidal optical signal is amplified with an Erbium-doped fiber amplifier (EDFA) prior to launching into the Kerr phase interrogator.

16. An apparatus comprising:
a Kerr phase interrogator configured to receive an input frequency-swept sinusoidal optical signal,
wherein the input frequency-swept sinusoidal optical signal comprises two orthogonally polarized frequency-swept sinusoidal optical signal portions with one or more relative phase variations; and
a loss device for isolating one or more power variations in a frequency-swept sinusoidal optical signal at an output of the Kerr phase interrogator,
wherein, the one more power variations in the frequency-swept sinusoidal optical signal at the output of the Kerr phase interrogator correspond to the one or more phase variations in the input frequency-swept sinusoidal optical signal.

17. The apparatus of claim 16, wherein the loss device comprise a band-pass filter with bandwidth of approximately 3 GHz.

18. The apparatus of claim 16 wherein the input frequency-swept sinusoidal optical signal comprising two orthogonally polarized frequency-swept sinusoidal optical signal portions with one or more relative phase variations is produced by splitting a source frequency-swept sinusoidal optical signal into a first signal portion and a second signal portion, wherein the first signal portion and the second signal portion are orthogonally polarized, launching the first signal portion into an optical medium and combining a resulting one or more back reflections with the second signal portion to thereby produce the input frequency-swept sinusoidal optical signal comprising two orthogonally polarized frequency-swept sinusoidal optical signal portions with relative phase variations.

19. The apparatus of claim 18 wherein a fiber-coupled polarization beam splitter is used to split the source frequency-swept sinusoidal optical signal into the first signal portion and the second signal portion, wherein the first and the second signal portions are orthogonally polarized.

20. The apparatus of claim 18 wherein an optical circulator is used for launching the first signal portion into the optical medium.

21. The apparatus of claim 18 wherein a fiber-coupled polarization beam combiner is used to combine one or more back reflections with the second signal portion.

22. A method comprising:
inducing one or more phase variations between orthogonally polarized signal portions in an input frequency-swept sinusoidal optical signal, wherein one or more phase variations result from propagation through one or more internal or external optical mediums; and
transmitting the input frequency-swept sinusoidal optical signal through a Kerr phase interrogator, wherein the Kerr phase interrogator converts the input frequency-swept sinusoidal optical signal with one or more phase variations into an output frequency-swept sinusoidal optical signal with one or more corresponding power variations, thereby performing an all optical beat acquisition.

23. The method of claim 22, wherein the orthogonally polarized signal portions in the input frequency-swept sinusoidal optical signal have identical frequencies.

24. The method of claim 22, wherein the orthogonally polarized signal portions in the input frequency-swept sinusoidal optical signal have different frequencies.

25. A method comprising:
inducing one or more phase variations between orthogonally polarized signal portions of an input frequency-swept sinusoidal optical signal, to thereby produce an input frequency-swept sinusoidal optical signal having one or more phase variations, wherein the one or more phase variations result from propagation of the orthogonally polarized signal portions across separate signal paths; and
launching the input frequency-swept sinusoidal optical signal having the one or more phase variations into an input of a Kerr phase-interrogator, to thereby produce an output frequency-swept sinusoidal optical signal having one or more power variations at an output of the Kerr phase interrogator, wherein the one or more power variations at the output of the Kerr phase-interrogator correspond to the one or more phase variations at the input of the Kerr phase-interrogator.

26. The method of claim 25 wherein the orthogonally polarized signal portions of the input frequency-swept sinusoidal optical signal have identical frequencies.

27. The method of claim 25 wherein the orthogonally polarized signal portions of the input frequency-swept sinusoidal optical signal have different frequencies.

28. A method comprising:
inducing one or more phase variations in an input frequency-swept optical signal, wherein the one or more phase variations are induced between orthogonally polarized signal portions of the input frequency-swept sinusoidal optical signal, and wherein the one or more phase variations result from propagation of the orthogonally polarized signal portions across separate signal paths; and
transmitting the input frequency-swept sinusoidal optical signal through a Kerr phase interrogator, wherein the Kerr phase interrogator converts the input frequency-swept sinusoidal optical signal with one or more phase variations into an output frequency-swept sinusoidal optical signal with one or more corresponding power variations, thereby performing an all optical beat acquisition.

29. The method of claim 28 wherein the orthogonally polarized signal portions of the input frequency-swept sinusoidal optical signal have identical frequencies.

30. The method of claim 28 wherein the orthogonally polarized signal portions of the input frequency-swept sinusoidal optical signal have different frequencies.

* * * * *